H. C. ROGERS.
AUTOMOBILE BODY HEATER.
APPLICATION FILED DEC. 2, 1918.
1,428,299.
Patented Sept. 5, 1922.
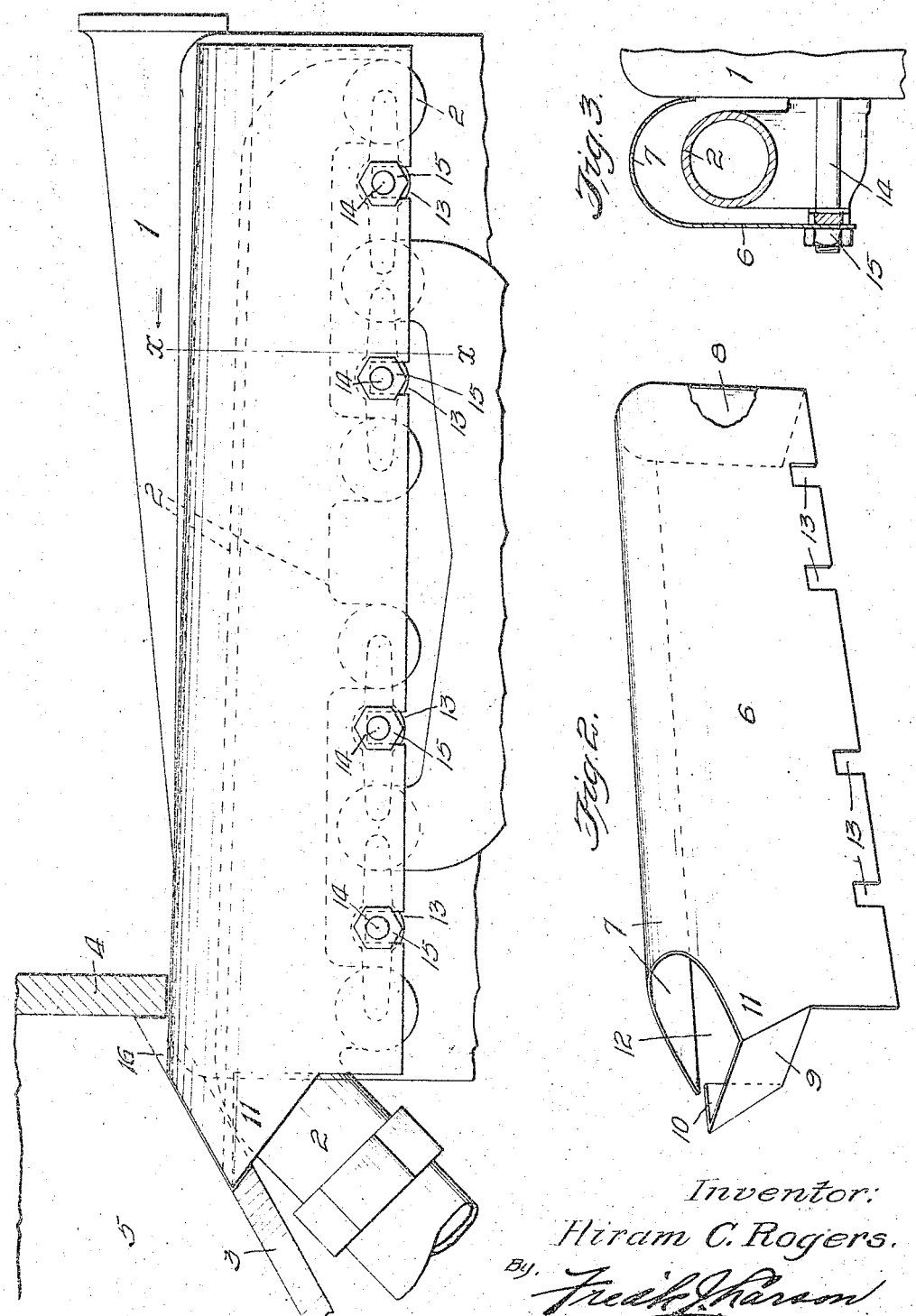
Inventor:
Hiram C. Rogers.
By
Attorney.

Patented Sept. 5, 1922.

1,428,299

UNITED STATES PATENT OFFICE.

HIRAM C. ROGERS, OF ST. LOUIS, MISSOURI.

AUTOMOBILE BODY HEATER.

Application filed December 2, 1918. Serial No. 264,887.

*To all whom it may concern:*

Be it known that I, HIRAM C. ROGERS, a citizen of the United States, residing in the city of St. Louis and State of Missouri, have invented a certain new and useful Automobile Body Heater, of which the following is a specification.

My invention relates to an improved heater particularly adapted for heating the interior of an automobile body, and, has for its object, the provision of a device adapted to direct the heat radiated from the exhaust manifold, or like pipe having connection with an internal combustion motor.

A further object of the invention is to provide a novel means of supporting the heater in position with relation to the exhaust manifold, or pipe.

Another object of my invention is to design my device and apply it to a radiator of heat, in such a manner that fresh air may be supplied thereinto, heated, and conveyed to the interior of an automobile body where it is emitted for heating the same.

A still further object of my invention is to design my device so that it will be simple in construction, thus resulting in durability, efficiency and economy.

I attain these objects by means of the device illustrated in the accompanying drawing, in which:—

Fig. 1, is a side elevation of a portion of an internal combustion motor, of the automobile type, showing my device supported thereby and forming a housing about the exhaust manifold thereof and within which, fresh air is heated and conveyed to the interior of an automobile body where it is discharged for heating purposes.

Fig. 2, is a perspective view of my improved heater.

Fig. 3, is a sectional view taken on line *x—x* of Fig. 1, looking in direction of the arrow.

Referring to the drawing, the reference character 1 designates an internal combustion motor, 2, the exhaust manifold, or pipe; 3, a portion of the floor of an automobile body, and 4, the dash thereof, while 5 designates a portion only of the interior of an automobile body.

In carrying out the aim of my present invention, I provide a heater adapted to practically house the exhaust manifold 2, as shown in Figures 1 and 3. The motor 1 forms a wall on one side.

The heater consists of a sheet of metal forming an outer side wall 6, the preferably curved top 7, the closed end 8, and the inclined breast piece 9 which terminates in a short rearwardly extending inner wall piece 10 to assist in forming the neck 11, and the hot air discharge opening 12 at the upper rear end of the heater hood. The outer wall 6 is provided at its lower edge with a plurality of cutaway portions 13 adapted to straddle the screw threaded studs 14 supported by the motor 1. Nuts 15 carried by the studs 14 tend, when tightened, to hold the heater in position about the exhaust manifold 2, once the heater is properly positioned, as clearly shown in Figures 1 and 3.

For illustrative purposes only, I have shown the discharge opening of the heater as positioned and terminating at the forward end of an automobile body, as shown in Fig. 1. It will be noticed that I have provided the floor 3, with an opening 16, for the reception of the neck 11 of the heater. It will here be understood that where it is desired to emit the heated air from the heater to some other part of the vehicle than the front end thereof, that the neck 11 may be extended by attaching thereto the desired length of pipe and leading same to any part of the vehicle desired, such for instance as to the front of the rear seat of the vehicle.

The many advantages of the hereindescribed invention will readily suggest themselves to those skilled in the art to which it appertains.

While I have illustrated and described the preferred embodiment of my invention, it is manifest that the same may be modified in its structure to adapt itself to application to the various types of exhaust manifolds, or pipes used, without departing from the spirit or sacrificing any of the advantages of my invention, hence, I wish it to be understood that I reserve the right to make any such changes or modifications that may fall within the scope of the appended claim, as may be necessary to apply it to the various types of exhaust manifolds, or other pipes which radiate heat, due to the passage of hot gases discharged from the engine therethrough.

What I claim is:

In combination with an exhaust manifold of an internal combustion engine, a heater hood consisting of a metallic sheet forming an outer side wall terminating at its upper end in a curved top and at one end in a closed end wall for said hood, a portion of the forward end of said side wall terminating in a transversely disposed inclined breast plate, a portion of the free end thereof terminating in a rearwardly directed short wall piece to assist in forming a neck having a hot air discharge opening and the outer side wall of said hood having its lower edge provided with a plurality of cutaway portions to straddle and receive engine studs provided with securing nuts for supporting and locking the hood in position about the exhaust manifold.

In testimony whereof, I have hereunto signed my name to the specification.

HIRAM C. ROGERS.